United States Patent [19]
Mathers

[11] 3,905,912
[45] Sept. 16, 1975

[54] RARE EARTH ACTIVATED HAFNIUM PHOSPHATE LUMINESCENT MATERIALS

[75] Inventor: James E. Mathers, Ulster, Pa.

[73] Assignee: GTE Sylvania Incorporated, Stamford, Conn.

[22] Filed: Sept. 25, 1974

[21] Appl. No.: 509,289

[52] U.S. Cl..................... 252/301.4 P; 252/301.4 F
[51] Int. Cl................................................ C09k 1/36
[58] Field of Search. 252/301.4 P, 301.4 R, 301.4 F

[56] References Cited
UNITED STATES PATENTS

| | | | |
|---|---|---|---|
| 2,427,728 | 9/1947 | Jenkins et al.................. | 252/301.4 P |
| 3,488,292 | 1/1970 | McAllister..................... | 252/301.4 P |
| 3,527,710 | 9/1970 | Toma et al. .................. | 252/301.4 P |
| 3,586,637 | 6/1971 | Blasse et al.................. | 252/301.4 P |
| 3,600,324 | 8/1971 | Bril et al....................... | 252/301.4 P |
| 3,609,094 | 9/1971 | Shaffer ......................... | 252/301.4 P |

*Primary Examiner*—Jack Cooper
*Attorney, Agent, or Firm*—Norman J. O'Malley; William H. McNeill; Donald R. Castle

[57] ABSTRACT

Luminescent materials having an $Hf_3(PO_4)_4$ host with an activator selected from the group consisting of terbium, praseodymium, dysprosium, thulium and europium. Color emission varies from red through blue depending upon activator. Excitation radiation includes one or more of cathode rays (CR) long and short wavelength ultraviolet (U.V.) and x-ray. The phosphors are prepared by firing in open crucibles a homogeneous mixture of suitable compounds to yield the phosphor.

5 Claims, No Drawings

RARE EARTH ACTIVATED HAFNIUM PHOSPHATE LUMINESCENT MATERIALS

BACKGROUND OF THE INVENTION

This invention relates to luminescent materials of the type known as phosphors. More particularly, it relates to phosphors having an $Hf_3(PO_4)_4$ host and a rare earth (RE) activator.

It would be an advance in the art to provide a family of phosphors having a wide range of color emission and a wide range of energizing radiation.

OBJECTS AND SUMMARY OF THE INVENTION

It is an object of this invention to provide such a family of phosphors.

It is yet another object of the invention to provide a method of making such phosphors.

These objects are accomplished in one aspect of the invention by the provision of a family of phosphors having as host $Hf_3(PO_4)_4$ with a rare-earth activator selected from the group consisting of terbium, praseodymium, dysprosium, thulium, and europium. The color gamut will range from red to blue depending upon activator.

The phosphors are prepared by forming mixtures of a suitable hafnium source, a suitable phosphate source, and a suitable RE source, and then firing for a sufficient time at a suitable temperature to form the phosphor. The firing takes place in open crucibles.

DESCRIPTION OF THE PREFERRED EMBODIMENTS

For a better understanding of the present invention, together with other and further objects, advantages, and capabilities thereof, reference is made to the following disclosure and appended claims.

Referring now to the invention with greater particularity, there are herein provided $Hf_3(PO_4)_4$ host phosphors having as an activator from about 0.05 to 0.10 mole of a rare-earth selected from the group consisting of terbium, preseodymium, dysprosium, thulium, and europium.

These phosphors can be prepared ny heating mixtures of suitable sources of hafnium, phosphate, and RE. Such suitable sources for hafnium and the RE can be, for example, oxides, oxychlorides, hydroxides, basic carbonates, oxalates, or nitrates. The phosphate source can be either acid or oxide phosphorus compounds. Preferably, the compound is one of the ammonium phosphates.

The following non-limiting examples are exemplary. It should further be recognized that the starting materials used should be of the higher degree of purity which is recognized in the art to be necessary for the preparation of luminescent materials.

EXAMPLE I

The following materials:
63.1 g hafnium dioxide ($HfO_2$)
52.8 g diammonium hydrogen phosphate [$(NH_4)_2 HPO_4$]
1.87 g terbium oxide ($Tb_4O_7$)
are intimately mixed together to form a substantially homogeneous mixture. This mixture is then heated for four hours at 1,300°C in an open crucible. When cool, the phosphor product, $Hf_3(PO_4)_4$: Tb, emits a bright yellowish-green when excited by 2537A U.V. radiation; 3,650A U.V. radiation and CR.

EXAMPLE II

The following materials:
63.1 g $HfO_2$
52.8 g $(NH_4)_2 HPO_4$
1.70 g $Pr_6O_{11}$
are mixed and treated as in Example I. The phosphor product emits red when irradiated with CR.

EXAMPLE III

The following materials:
63.1 g $HfO_2$
52.8 g $(NH_4)_2 HPO_4$
0.933 g $Dy_2O_3$
are mixed and treated as in Example I. The phosphor product emits a yellowish-tan when irradiated with CR.

EXAMPLE IV

The following materials
63.1 g $HfO_2$
52.8 g $(NH_4)_2 HPO_4$
0.965 g $Tm_2O_3$
are mixed and treated as in Example I. The phosphor product emits blue when irradiated with CR.

EXAMPLE V

The following materials:
63.1 g $HfO_2$
52.8 g $(NH_4)_2 HPO_4$
0.880 g $Eu_2O_3$
are mixed and treated as in Example I. The phosphor product emits red when excited by 2,537A and 3,650A U.V. and CR.

In the above phosphors, when either terbium or praseodymium is used as an activator, it is recommended that the phosphor be annealed by firing in pure hydrogen for about 6 hours. This annealing step produces a phosphor having a white body color.

It will be seen from the above that there is herein provided a new and novel family of phosphors having unique characteristics.

While there have been shown and described what are at present considered the preferred embodiments of the invention, it will be apparent to those skilled in the art that various changes and modifications can be made therein without departing from the scope of the invention as defined by the appended claims.

What is claimed is:

1. A phosphor material having the general formula $Hf_3(PO_4)_4$: RE wherein RE is selected from the group consisting of: terbium, praseodymium; dysprosium; thulium; and europium and is present in an amount of from about 0.05 to 0.1 mole per mole of $Hf_3(PO_4)_4$.

2. The method of making a phosphor material having the general formula $Hf_3(PO_4)_4$: RE wherein RE is selected from the group consisting of terbium, praseodymium, dysprosium, thulium and europium and is present in an amount of from about 0.05 to 0.10 mole per mole of $Hf_3(PO_4)_4$ said method comprising the steps of: forming a substantially homogeneous mixture of a hafnium compound, a phosphate compound and a RE compound in amounts that will yield said phosphor upon subsequent heating; and heating said mixture in an open crucible for about four hours at about 1,300°C.

3. The method of claim 2 wherein said hafnium compound is $HfO_2$.

4. The method of claim 3 wherein said phosphate compound is $(NH_4)_2 HPO_4$.

5. The method of claim 4 wherein said RE compound is an oxide.

* * * * *